(12) United States Patent
Ito et al.

(10) Patent No.: US 9,012,672 B2
(45) Date of Patent: Apr. 21, 2015

(54) DIHYDROXYPROPYLAMIDE-MODIFIED POLYSILOXANE COMPOUND

(75) Inventors: Masaaki Ito, Himeji (JP); Hikaru Shibata, Himeji (JP)

(73) Assignee: Daicel Corporation, Osaka-Shi (JP)

( * ) Notice: Subject to any disclaimer, the term of this patent is extended or adjusted under 35 U.S.C. 154(b) by 273 days.

(21) Appl. No.: 13/560,537

(22) Filed: Jul. 27, 2012

(65) Prior Publication Data

US 2013/0030208 A1    Jan. 31, 2013

(30) Foreign Application Priority Data

Jul. 28, 2011    (JP) ................................ 2011-165118

(51) Int. Cl.
    *C07F 7/10*          (2006.01)
    *C08G 77/388*     (2006.01)
    *C08G 77/12*      (2006.01)

(52) U.S. Cl.
    CPC ............. *C08G 77/388* (2013.01); *C08G 77/12* (2013.01)

(58) Field of Classification Search
    USPC ................... 556/410, 413, 419, 425
    See application file for complete search history.

(56) References Cited

U.S. PATENT DOCUMENTS

| 5,618,525 | A | 4/1997 | Bünning |
| 5,690,129 | A | 11/1997 | Bünning |
| 2004/0091439 | A1 | 5/2004 | Kamei et al. |
| 2006/0165629 | A1 | 7/2006 | Kamei et al. |
| 2009/0203802 | A1 | 8/2009 | Kamei et al. |
| 2011/0065863 | A1* | 3/2011 | Fitremann et al. ........... 525/54.2 |

FOREIGN PATENT DOCUMENTS

| JP | 6-305933 | A | 11/1994 |
| JP | 8-40839 | A | 2/1996 |
| JP | 2001-58926 | A | 3/2001 |
| JP | 2004-169015 | A | 6/2004 |

* cited by examiner

*Primary Examiner* — Sudhakar Katakam
*Assistant Examiner* — Pancham Bakshi
(74) *Attorney, Agent, or Firm* — Birch, Stewart, Kolasch & Birch, LLP

(57) ABSTRACT

A modified polysiloxane compound is represented by following Formula (1), in which $R^1$ to $R^9$ represent hydrocarbon groups selected from linear alkyl groups having 1 to 20 carbon atoms, branched chain alkyl groups having 3 to 6 carbon atoms, and cyclic alkyl groups having 3 to 6 carbon atoms; p and q represent average numbers of siloxane units indicated in parentheses, where p is a number of 1 or more and q is a number of 2 or more; and "A" represents a group selected from a group represented by following Formula (2), a group represented by following Formula (3), and hydrogen atom. The modified polysiloxane compound has at least a siloxane unit wherein "A" is the group represented by following Formula (2), and a siloxane unit wherein "A" is the group represented by following Formula (3).

[Chem. 1]

$$R^2-\underset{\underset{R^3}{|}}{\overset{\overset{R^1}{|}}{Si}}-O{\left[\underset{\underset{R^8}{|}}{\overset{\overset{R^7}{|}}{Si}}-O\right]}_p{\left[\underset{\underset{A}{|}}{\overset{\overset{R^9}{|}}{Si}}-O\right]}_q\underset{\underset{R^6}{|}}{\overset{\overset{R^4}{|}}{Si}}-R^5 \quad (1)$$

[Chem. 2]

$$\overset{CH_3}{\underset{R^{10}}{\diagup\diagdown\diagup\diagdown}} \quad (2)$$

$$\underset{O}{\overset{\diagup\diagdown\diagup\diagdown}{\underset{R^{11}}{\diagdown}}}\underset{N}{\overset{R^{12}}{|}}\diagdown\diagup\underset{OH}{\overset{OH}{|}}\diagdown OH \quad (3)$$

7 Claims, 6 Drawing Sheets

DIHYDROXYPROPYLAMIDE-MODIFIED POLYSILOXANE COMPOUND

This application claims priority under 35 U.S.C. §119 to application JP 2011-165118, filed in Japan on Jul. 28, 2011.

TECHNICAL FIELD

The present invention relates to a modified polysiloxane compound, and a production method thereof.

BACKGROUND ART

Silicones have been used in wide areas and used, typically in cosmetics areas, oil components, emulsifiers, film-forming ingredients, and gelling agents. Silicones to be developed are designed so as to have properties suitable for the respective uses.

Specifically, hydrophilic-group-modified polysiloxane compounds are used typically as emulsifiers for cosmetics, or as dispersion stabilizers for inorganic or organic powders to be added to cosmetics, which modified polysiloxane compounds are obtained by grafting a hydrophilic group (e.g., polyoxyalkylene group, glyceryl group, polyglyceryl group, or polyethyloxazoline group) to polysiloxane compounds (see, for example, Japanese Unexamined Patent Application Publication (JP-A) No. 2001-040839 (PTL 3), and JP-A No. 2004-169015 (PTL 4)). These hydrophilic-group-modified polysiloxane compounds, however, fail to have emulsification functions sufficiently optimized corresponding to respective types of usage. Independently, inorganic fine powders serving typically as pigments and ultraviolet absorbers are added to makeup cosmetics. Some types of hydrophilic-group-modified polysiloxane compounds may not provide sufficient dispersibility of such inorganic fine powders to cause unsatisfactory finish or unsatisfactory impression from use. To avoid these, a demand has been made to provide a hydrophilic-group-modified polysiloxane compound having more satisfactory emulsion stability and dispersibility. In addition, a strong demand has been made to provide a modified polysiloxane compound having satisfactory compatibility with various cosmetics, from the aspect of productivity.

Modified polysiloxane compounds to be formulated into makeup cosmetics require excellent water repellency and, particularly when used as film-forming ingredients, require both satisfactory water repellency and satisfactory oil repellency so as to help the makeup cosmetics to have higher adhesion to the skin surface, thus helping makeup to last longer. However, there has not yet been found a modified polysiloxane compound which sufficiently satisfies these requirements.

Specifically, under present circumstances, there has not yet been found a modified polysiloxane compound which excels in compatibility with various cosmetics, emulsion stability, and dispersibility and has such water repellency and oil repellency as to help oil-based cosmetics (e.g., lipsticks, eye shadow, eyeliner, and oil-based foundations) to last longer (to help makeup to last longer) after applied to the skin and to be resistant to migration and penetration to the clothing.

CITATION LIST

Patent Literature

PTL 1: JP-A No. 2001-058926
PTL 2: JP-A No. H06-305933
PTL 3: JP-A No. H08-040839
PTL 4: JP-A No. 2004-169015

SUMMARY OF INVENTION

Technical Problem

Accordingly, an object of the present invention is to provide a novel modified polysiloxane compound which has satisfactory water repellency and oil repellency and excels in emulsion stability, dispersibility, and compatibility. Another object of the present invention is to provide a method for producing the modified polysiloxane compound.

Solution to Problem

After intensive investigations to achieve the objects, the present inventors have found a modified polysiloxane compound obtained by grafting a saturated hydrocarbon group and a dihydroxypropylamido group to a polysiloxane compound; and have found that this modified polysiloxane compound has satisfactory water repellency and oil repellency and excels in emulsion stability, dispersibility, and compatibility, and that the polysiloxane compound, when added as a film-forming ingredient to an oil-based cosmetic, can form a coat (film) excellent in water repellency and oil repellency and, when the oil-based cosmetic is applied to the skin as makeup, helps the makeup to last long and to be resistant to migration and penetration to the clothing. The present invention has been made based on these findings.

Specifically, the present invention provides a modified polysiloxane compound represented by following Formula (1):

[Chem. 1]

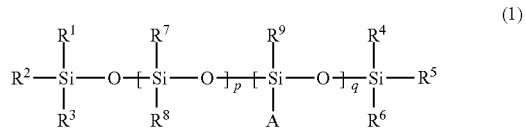

(1)

wherein $R^1$, $R^2$, $R^3$, $R^4$, $R^5$, $R^6$, $R^7$, $R^8$, and $R^9$ are the same as or different from one another and independently represent a hydrocarbon group selected from the group consisting of a linear alkyl group having 1 to 20 carbon atoms, a branched chain alkyl group having 3 to 6 carbon atoms, and a cyclic alkyl group having 3 to 6 carbon atoms; p and q each represent an average number of siloxane units indicated in parentheses, where p is a number of 1 or more and q is a number of 2 or more; and "A" represents a group selected from the group consisting of a group represented by following Formula (2), a group represented by following Formula (3), and hydrogen atom, and wherein the modified polysiloxane compound has at least a siloxane unit wherein "A" is the group represented by following Formula (2), and a siloxane unit wherein "A" is the group represented by following Formula (3):

[Chem. 2]

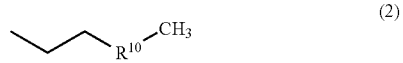

(2)

-continued

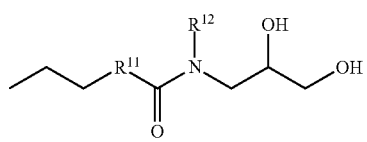
(3)

wherein $R^{10}$ represents single bond or a linear or branched chain alkylene group having 1 to 17 carbon atoms; $R^{11}$ represents single bond or a linear or branched chain alkylene group having 1 to 17 carbon atoms; and $R^{12}$ represents hydrogen atom or a linear, branched chain, or cyclic alkyl group having 1 to 6 carbon atoms.

In the modified polysiloxane compound represented by Formula (1), in siloxane units represented by following Formula (a):

[Chem. 3]

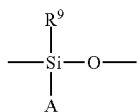
(a)

wherein $R^9$ and "A" are as defined above, the content of a siloxane unit of Formula (a) wherein "A" is the group represented by Formula (3) is preferably 1 mole percent or more based on the total moles of the siloxane units represented by Formula (a).

The total of p and q (p+q) is preferably from 4 to 5000 and more preferably from 10 to 40; and the ratio of p to the total of p and q [p/(p+q)] is preferably from 0.05 to 0.9.

The substituents $R^1$ to $R^9$ are preferably methyl groups; and $R^{12}$ is preferably hydrogen atom or methyl group.

The present invention further provides a method for producing the modified polysiloxane compound. The method includes the step of grafting, through a hydrosilylation reaction, a compound represented by following Formula (5) and a compound represented by following Formula (6):

[Chem. 5]

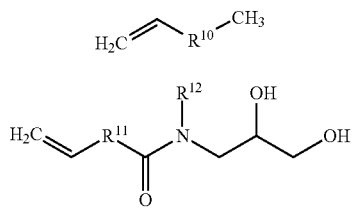

wherein $R^{10}$ represents single bond or a linear or branched chain alkylene group having 1 to 17 carbon atoms; $R^{11}$ represents single bond or a linear or branched chain alkylene group having 1 to 17 carbon atoms; and $R^{12}$ represents hydrogen atom or a linear, branched chain, or cyclic alkyl group having 1 to 6 carbon atoms, to a polysiloxane compound represented by following Formula (4):

[Chem. 4]

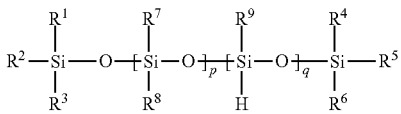
(4)

wherein $R^1$, $R^2$, $R^3$, $R^4$, $R^5$, $R^6$, $R^7$, $R^8$, and $R^9$ are the same as or different from one another and independently represent a hydrocarbon group selected from the group consisting of a linear alkyl group having 1 to 20 carbon atoms, a branched chain alkyl group having 3 to 6 carbon atoms, and a cyclic alkyl group having 3 to 6 carbon atoms; and p and q each represent an average number of siloxane units indicated in parentheses, where p is a number of 1 or more and q is a number of 2 or more.

Advantageous Effects of Invention

A modified polysiloxane compound represented by Formula (1) according to an embodiment of the present invention has satisfactory water repellency and oil repellency and excels in emulsion stability, dispersibility, and compatibility. The modified polysiloxane compound represented by Formula (1) is therefore easy to be added to various cosmetics and, when added to an oil-based cosmetic, can impart satisfactory water repellency and oil repellency to a coat formed from the oil-based cosmetic. Thus, after the oil-based cosmetic is applied to the skin as makeup, the modified polysiloxane compound helps the makeup to last long and to be resistant to migration and penetration to the clothing. The modified polysiloxane compound represented by Formula (1) is advantageously usable particularly in oil-based cosmetics such as lipsticks, eye shadow, eyeliners, and oil-based foundations.

These and other objects, features, and advantages of the present invention will be more fully understood from the following description of embodiments with reference to the attached drawings. All numbers are herein assumed to be modified by the term "about."

DESCRIPTION OF EMBODIMENTS

Modified Polysiloxane Compound

Figure 1:
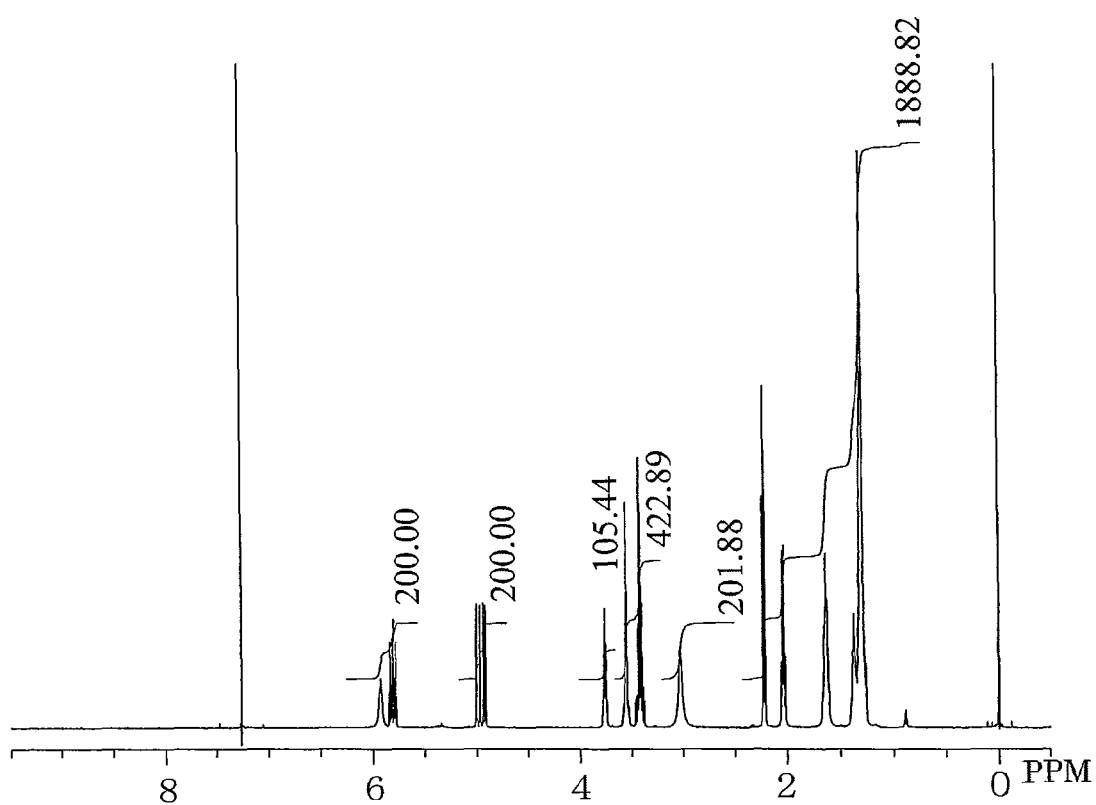
FIG. 1 depicts a $^1$H-NMR spectrum of a reaction product obtained in Example 1.

A modified polysiloxane compound according to an embodiment of the present invention is represented by Formula (1) and is a random or block copolymer including a siloxane unit represented by following Formula (a); and a siloxane unit represented by following Formula (b). In the following formulae, $R^7$, $R^8$, $R^9$, and "A" are as defined above.

[Chem. 6]

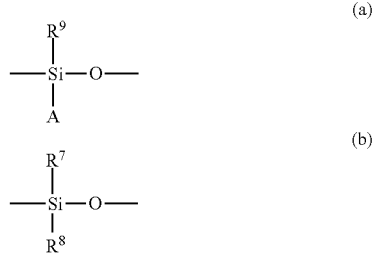

In the formulae, "A" represents a group selected from a group represented by Formula (2), a group represented by Formula (3), and hydrogen atom. Specifically, the siloxane unit represented by Formula (a) is any of siloxane units represented by following Formulae (a1), (a2), and (a3). In the following formulae, $R^9$, $R^{10}$, $R^{11}$, and $R^{12}$ are as defined above.

[Chem. 7]

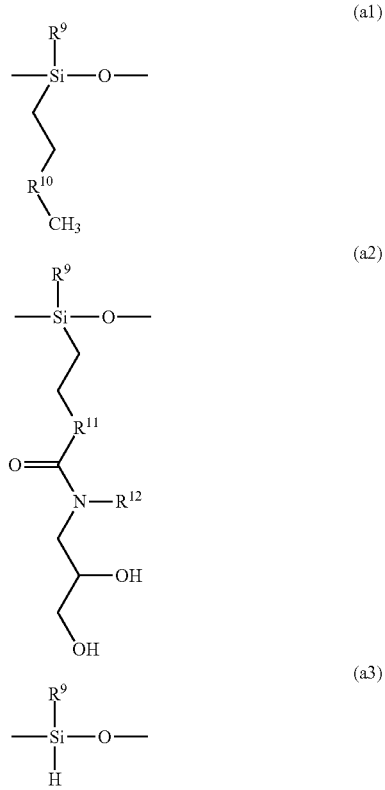

The modified polysiloxane compound according to the present invention has at least a siloxane unit where "A" is the group represented by Formula (2) (i.e., the siloxane unit represented by Formula (a1)), and a siloxane unit where "A" is the group represented by Formula (3) (i.e., the siloxane unit represented by Formula (a2)).

In the formulae, $R^1$ to $R^9$ are the same as or different from one another and independently represent a hydrocarbon group selected from a linear alkyl group having 1 to 20 carbon atoms, a branched chain alkyl group having 3 to 6 carbon atoms, and a cyclic alkyl group having 3 to 6 carbon atoms. The numbers p and q each represent an average number of siloxane units indicated in parentheses, where p is a number of 1 or more and q is a number of 2 or more. $R^{10}$ represents single bond or a linear or branched chain alkylene group having 1 to 17 carbon atoms. $R^{11}$ represents single bond or a linear or branched chain alkylene group having 1 to 17 carbon atoms; and $R^{12}$ represents hydrogen atom or a linear, branched chain, or cyclic alkyl group having 1 to 6 carbon atoms. When p is 2 or more, two or more $R^7$s may be the same as or different from one another; and two or more $R^8$s may be the same as or different from one another. Independently, two or more $R^9$s may be the same as or different from one another.

Exemplary linear alkyl groups having 1 to 20 carbon atoms as $R^1$ to $R^9$ include methyl, ethyl, propyl, butyl, pentyl, hexyl, octyl, decyl, dodecyl, tetradecyl, hexadecyl, and octadecyl groups. Exemplary branched chain alkyl groups having 3 to 6 carbon atoms include isopropyl, sec-butyl, tert-butyl, neopentyl, and 1-ethylpropyl groups. Exemplary cyclic alkyl groups having 3 to 6 carbon atoms include cyclopentyl and cyclohexyl groups. Among them, linear alkyl groups having 1 to 6 carbon atoms are preferred herein, of which methyl group is more preferred.

Exemplary linear or branched chain alkylene groups having 1 to 17 carbon atoms as $R^{10}$ include linear alkylene groups such as methylene, ethylene, trimethylene, tetramethylene, pentamethylene, hexamethylene, heptamethylene, octamethylene, nonamethylene, decamethylene, undecamethylene, dodecamethylene, and tridecamethylene groups; and branched chain alkylene groups each including any of the linear alkylene groups to which an alkyl group having 1 to about 3 carbon atoms is bonded, such as methylmethylene and methylethylene groups. Among them, $R^{10}$ herein is preferably a linear or branched chain alkylene group (more preferably a linear alkylene group) having 2 to 13 carbon atoms.

Exemplary linear or branched chain alkylene group having 1 to 17 carbon atoms as $R^{11}$ are the same as in the linear or branched chain alkylene group having 1 to 17 carbon atoms as $R^{10}$. Among them, $R^{11}$ herein is preferably a linear or branched chain alkylene group (more preferably a linear alkylene group) having 2 to 13 carbon atoms.

Exemplary linear, branched chain, or cyclic alkyl groups having 1 to 6 carbon atoms as $R^{12}$ include methyl, ethyl, propyl, butyl, pentyl, hexyl, isopropyl, sec-butyl, tert-butyl, neopentyl, 1-ethylpropyl, cyclopentyl, and cyclohexyl groups. Among them, $R^{12}$ herein is preferably hydrogen atom or methyl group.

The numbers p and q each represent an average number of siloxane units indicated in parentheses, where p is a number of 1 or more, preferably from 2 to 2000, more preferably from 4 to 500, and most preferably from 10 to 30; and q is a number of 2 or more, preferably from 2 to 2000, more preferably from 4 to 500, and most preferably from 10 to 30.

The total of p and q, (p+q), is typically from about 4 to about 5000, preferably from 8 to 1000, more preferably from 10 to 50, and most preferably from 10 to 40.

The content of the siloxane unit represented by Formula (a) is typically from about 5 to 90 mole percent, preferably from 10 to 90 mole percent, more preferably from 10 to 70 mole percent, furthermore preferably from 30 to 60 mole percent, particularly preferably from 35 to 50 mole percent, and most preferably from 40 to 50 mole percent, based on the total amount (100 mole percent) of the siloxane unit represented by Formula (a) and the siloxane unit represented by Formula (b). Specifically, the ratio of q to the total of p and q [q/(p+q)]

is typically from about 0.05 to about 0.9, preferably from 0.1 to 0.9, more preferably from 0.1 to 0.7, furthermore preferably from 0.3 to 0.6, particularly preferably from 0.35 to 0.5, and most preferably from 0.4 to 0.5.

The content of the siloxane unit represented by Formula (b) is typically from about 5 to about 90 mole percent, preferably from 10 to 90 mole percent, more preferably from 10 to 70 mole percent, particularly preferably from 30 to 60 mole percent, and most preferably from 50 to 60 mole percent, based on the total amount (100 mole percent) of the siloxane unit represented by Formula (a) and the siloxane unit represented by Formula (b). Specifically, the ratio of p to the total of p and q [p/(p+q)] is typically from about 0.05 to about 0.9, preferably from 0.1 to 0.9, more preferably from 0.1 to 0.7, particularly preferably from 0.3 to 0.6, and most preferably from 0.5 to 0.6.

The content of the siloxane unit of Formula (a) where "A" is the group represented by Formula (2) (i.e., the siloxane unit represented by Formula (a1)) in the total siloxane units represented by Formula (a) (100 mole percent) is preferably from about 75 to about 99 mole percent, more preferably from 80 to 98 mole percent, and particularly preferably from 80 to 95 mole percent, for satisfactory miscibility with other compounding materials. If the content of the siloxane unit represented by Formula (a1) is less than the above-specified range, the modified polysiloxane compound may tend to have insufficient miscibility typically with hydrocarbon waxes and oils. In contrast, if the content of the siloxane unit represented by Formula (a1) is higher than the range, the modified polysiloxane compound may tend to have insufficient miscibility typically with silicone components.

The content of the siloxane unit of Formula (a) where "A" is the group represented by Formula (3) (i.e., the siloxane unit represented by Formula (a2)) in the total siloxane units represented by Formula (a) (100 mole percent) is preferably 1 mole percent or more, more preferably from 2 to 25 mole percent, and particularly preferably from 5 to 20 mole percent. If the content of the siloxane unit represented by Formula (a2) is less than the above-specified range, the modified polysiloxane compound may tend to have insufficient film-formability and unsatisfactory adhesion to the skin. In contrast, if the content of the siloxane unit represented by Formula (a2) is excessively high, the modified polysiloxane compound may have an excessively high viscosity or may have insufficient solubility in oil components, thus resulting in insufficient handleability and usability in production process.

The content of the siloxane unit of Formula (a) where "A" is hydrogen atom (i.e., the siloxane unit represented by Formula (a3)) in the total siloxane units represented by Formula (a) (100 mole percent) is preferably about 10 mole percent or less, more preferably 5 mole percent or less, and particularly preferably 2 mole percent or less. It is acceptable that the modified polysiloxane compound includes substantially no siloxane unit represented by Formula (a3). If the content of the siloxane unit represented by Formula (a3) is more than the above-specified range, the modified polysiloxane compound may be insufficient in water repellency, oil repellency, emulsion stability, dispersibility, compatibility, and storage stability.

The modified polysiloxane compound represented by Formula (1) according to the present invention is applicable to any usage not limited, is generally usable in applications to which amphiphilic compounds are applicable (e.g., dispersing agents and polymer emulsifiers, as well as additives typically for coating agents). Above all, the modified polysiloxane compound is particularly useful in cosmetic compositions (e.g., film-forming ingredients for lipsticks; surface coating agents and dispersing agents for inorganic ultraviolet absorbents to be used in sunscreens; dispersing agents for organic ultraviolet absorbents; and dispersing agents for foundation pigments.

The modified polysiloxane compound represented by Formula (1) according to the present invention includes a siloxane unit having the lipophilic group represented by Formula (2), and a siloxane unit having the hydrophilic group represented by Formula (3), is thereby miscible with a cosmetic oil component at a relatively low temperature without needing a dissolution process at an extremely high temperature, and contributes to reduction in production cost and environmental load.

In addition, the modified polysiloxane compound represented by Formula (1) according to the present invention not only excels in emulsion stability and gelation ability and excels in dispersing ability (dispersibility) typically of pigments, but also has satisfactory water repellency and oil repellency. The modified polysiloxane compound represented by Formula (1) according to the present invention, when formulated typically into oil-based solid cosmetics, cream cosmetics, and milky lotion cosmetics, helps them to form a coat excellent in water repellency and oil repellency, to have good finish and impression from use, and to have good adhesion to the skin (namely, it helps makeup to last long).

[Production Method of Modified Polysiloxane Compound]

The modified polysiloxane compound represented by Formula (1) may be produced through the step of grafting a compound represented by Formula (5) and a compound represented by Formula (6) to a polysiloxane compound represented by Formula (4) through a hydrosilylation reaction.

In Formula (4), $R^1$ to $R^9$ are the same as or different from one another and independently represent a hydrocarbon group selected from a linear alkyl group having 1 to 20 carbon atoms, a branched chain alkyl group having 3 to 6 carbon atoms, and a cyclic alkyl group having 3 to 6 carbon atoms; and p and q each represent an average number of siloxane units indicated in parentheses, where p is a number of 1 or more and q is a number of 2 or more. $R^1$ to $R^9$, p, and q correspond to $R^1$ to $R^9$, p, and q, respectively, in the modified polysiloxane compound represented by Formula (1).

In Formula (5), $R^{10}$ represents single bond or a linear or branched chain alkylene group having 1 to 17 carbon atoms. $R^{10}$ corresponds to $R^{10}$ in the group represented by Formula (2) in the modified polysiloxane compound represented by Formula (1).

In Formula (6), $R^{11}$ represents single bond or a linear or branched chain alkylene group having 1 to 17 carbon atoms; and $R^{12}$ represents hydrogen atom or a linear, branched chain, or cyclic alkyl group having 1 to 6 carbon atoms. $R^{11}$ and $R^{12}$ correspond to $R^{11}$ and $R^{12}$ in the group represented by Formula (3) in the modified polysiloxane compound represented by Formula (1).

The hydrosilylation reaction of the polysiloxane compound represented by Formula (4) with the compound represented by Formula (5) and the compound represented by Formula (6) is preferably performed in the presence of a catalyst. The catalyst is not limited and may be any of catalysts generally used for hydrosilylation reactions, of which preferred for use herein are platinum-group transition metal compounds such as chloroplatinic acid, Karstedt catalyst, dichloro(cycloocta-1,5-diene)platinum, palladium chloride, chlorotris(triphenylphosphine)rhodium(I), and dichlorotris(triphenylphosphine)ruthenium(II); platinum-group metal catalysts each supported on a solid, such as platinum/carbon, palladium/carbon, and platinum/alumina; platinum protective colloids prepared by reducing various platinum compounds in the presence of a surfactant.

Though not critical, the amount of the catalyst is typically from $10^{-7}$ to $10^{-2}$ mole, preferably from $10^{-6}$ to $10^{-3}$ mole, and particularly preferably from $10^{-5}$ to $10^{-4}$ mole, relative to the total amount (1 mole) of the compound represented by Formula (5) and the compound represented by Formula (6). If the amount of the catalyst is excessively small, it takes a long time for the reaction to proceed, and this may cause, for example, coloration due to thermal hysteresis and contamination of by-products into the product, thus resulting in inferior product quality. In contrast, the use of the catalyst in an excessively large amount is not desirable, because the catalyst used for the hydrosilylation reaction is generally expensive and causes increased cost of the catalyst production.

The reaction temperature is typically from about 10° C. to about 110° C. and preferably from about 65° C. to 90° C. The reaction time is not limited, and the reaction may be completed at the point of time when the conversion (rate of reaction) reaches a desired level, which conversion is determined by following the consumption of hydrosilyl groups derived from the polysiloxane compound represented by Formula (4), or the consumption of the compound represented by Formula (5) and the compound represented by Formula (6) through a suitable analysis technique such as alkali titration, liquid chromatography, gas chromatography, nuclear magnetic resonance spectrometry (NMR), or thin-layer chromatography (TLC). From the aspects of quality and productivity, the reaction time is set to be typically preferably from about 4 to about 80 hours, and more preferably from about 10 to about 60 hours, by regulating the reaction temperature and/or the technique for charging raw materials. The reaction may be performed under normal atmospheric pressure, under reduced pressure, or under a pressure (under a load). The reaction atmosphere is not limited, as long as not adversely affecting the reaction, and can be any of, for example, air atmosphere, nitrogen atmosphere, and argon atmosphere. The reaction may be performed according to any system such as batch system, semi-batch system, or continuous system.

After the completion of the reaction, a reaction product may be separated/purified by a separation procedure such as filtration, concentration, distillation, extraction, crystallization, recrystallization, or column chromatography, or a separation procedure of any combination of them.

Particularly when a platinum-group transition metal compound is used as the catalyst, a side reaction may occur at a certain frequency, in which terminal unsaturated groups of the compound represented by Formula (5) and the compound represented by Formula (6) rearrange (shift) inward, this may cause by-production and migration of a compound represented by following Formula (7) and/or a compound represented by following Formula (8) into the product.

[Chem. 8]

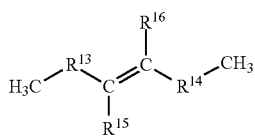

(7)

-continued

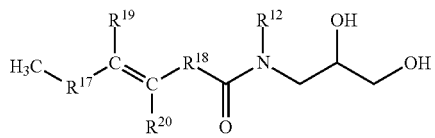

(8)

The compound represented by Formula (7) corresponds to the compound represented by Formula (5), except with the double bond rearranging inward, in which $R^{13}$ and $R^{14}$ are the same as or different from each other and independently represent single bond or a linear or branched chain alkylene group; and $R^{15}$ and $R^{16}$ are the same as or different from each other and independently represent hydrogen atom or a linear, or branched chain alkyl group. The total number of carbon atoms possessed by $R^{13}$, $R^{14}$, $R^{15}$ and $R^{16}$ is a number determined by subtracting 1 from the number of carbon atoms of $R^{10}$. The compound represented by Formula (8) corresponds to the compound represented by Formula (6), except with the double bond rearranging inward, in which $R^{17}$ and $R^{18}$ are the same as or different from each other and independently represent single bond or a linear or branched chain alkylene group; and $R^{19}$ and $R^{20}$ are the same as or different from each other and independently represent hydrogen atom or a linear, or branched chain alkyl group. The total number of carbon atoms possessed by $R^{17}$, $R^{18}$, $R^{19}$, and $R^{20}$ is a number determined by subtracting 1 from the number of carbon atoms of $R^{11}$. The group $R^{12}$ is as defined above.

Exemplary linear or branched chain alkylene groups as $R^{13}$, $R^{14}$, $R^{17}$, and $R^{18}$ include, of the linear or branched chain alkylene groups exemplified as $R^{10}$, those having 1 to 16 carbon atoms. Exemplary linear or branched chain alkyl groups as $R^{15}$, $R^{16}$, $R^{19}$, and $R^{20}$ include methyl, ethyl, propyl, butyl, pentyl, hexyl, isopropyl, sec-butyl, tert-butyl, neopentyl, and 1-ethylpropyl groups.

In some applications of the modified polysiloxane compound represented by Formula (1), the presence (coexistence) of the compound represented by Formula (7) and/or the compound represented by Formula (8) may cause deterioration in quality. For example, upon storage over the long term, odor may occur due to oxidative degradation or a harmful substance may be formed. In this case, the method preferably additionally employs a subsequent step after the step of grafting the compound represented by Formula (5) and the compound represented by Formula (6) to the polysiloxane compound represented by Formula (4) through a hydrosilylation reaction. Examples of the subsequent step (after-treatment step) include the step of removing the by-produced compound represented by Formula (7) and/or the compound represented by Formula (8) as a low-boiling component in a high vacuum; the step of decomposing the compound through an acid treatment (see JP-A No. H02-302438); and the step of hydrogenating the compound into a saturated hydrocarbon (see JP-A No. H09-165318).

In the method for producing the modified polysiloxane compound according to the present invention, a compound represented by following Formula (9):

[Chem. 9]

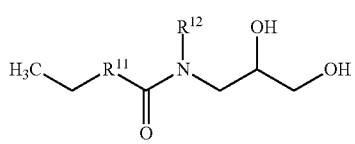

wherein $R^{11}$ and $R^{12}$ are as defined above, may be by-produced. When the modified polysiloxane compound represented by Formula (1) is used in a cosmetic composition, the compound represented by Formula (9) is useful. Typically, the compound represented by Formula (9) weakens crosslinking due to the interaction between polar groups with each other in the preparation process (particularly dissolving/mixing process) of the cosmetic composition and thereby helps the cosmetic composition to have more satisfactory handleability. In addition, when the modified polysiloxane compound represented by Formula (1) forms a higher-order structure with other compounding materials to turn into a gel, the compound represented by Formula (9) comes into the interstices in the higher-order structure and helps the higher-order structure to be further strong and to be maintained more stably in the gel state, thus being useful.

The method for producing a modified polysiloxane compound according to the present invention enables efficient production of the modified polysiloxane compound represented by Formula (1).

EXAMPLES

The present invention will be illustrated in further detail with reference to several working examples below. It should be noted, however, that these examples are never construed to limit the scope of the present invention.

Example 1

Synthesis of
3-(10-Undecenoylamido)propane-1,2-diol

Figure 2:
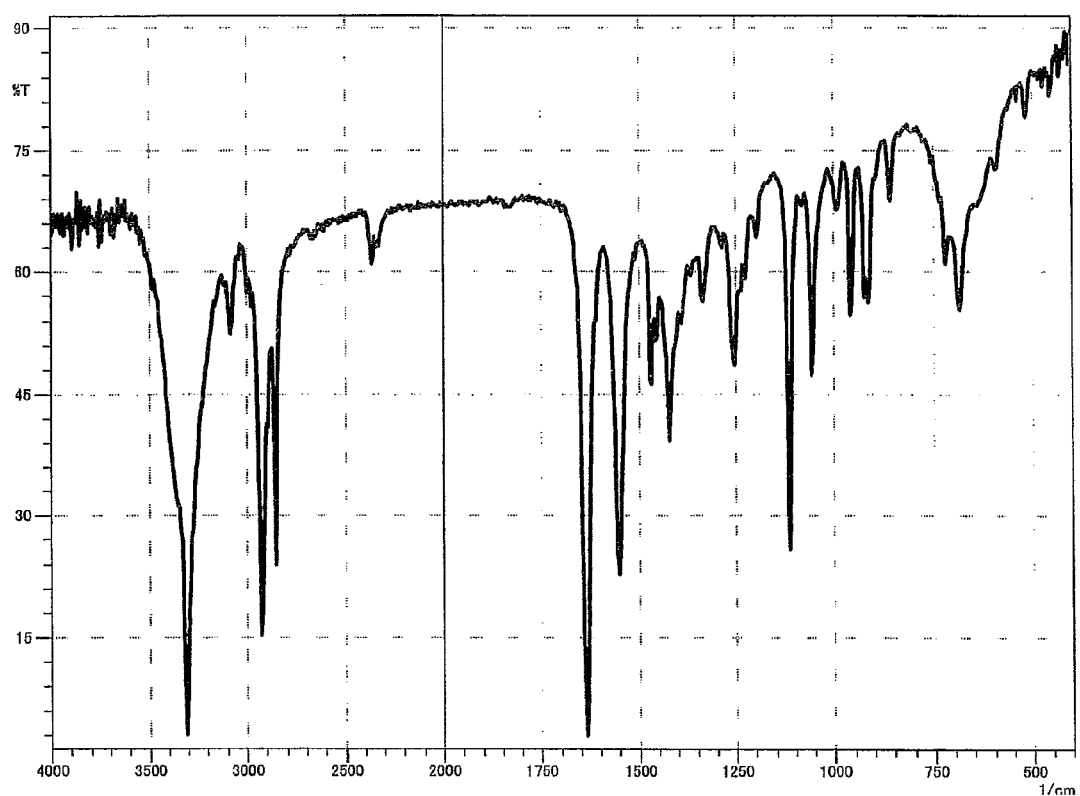
FIG. 2 depicts an IR spectrum of the reaction product obtained in Example 1.

In a 1-liter five-necked flask equipped with a reflux condenser, a nitrogen inlet with a three-way stopcock, a vent with a three-way stopcock, agitator blades with a decompression seal, and a thermometer were placed 333.15 g (1.68 mol) of methyl 10-undecenoate, 157.66 g (1.73 mol) of 3-aminopropane-1,2-diol, and 3.78 g (16.8 mmol) of a 24% solution of sodium methoxide in methanol. The mixture was subjected to a reaction by heating with stirring at 110° C. to 115° C. at a reduced pressure of 250 hPa to 40 hPa for 9 hours while distilling off formed methanol, cooled to room temperature, and thereby yielded a pale yellow crude product which is solid at room temperature. This was combined with 396 g of ethanol, heated at 80° C. with stirring, cooled to give crystals, the crystals were separated by filtration, washed two times sequentially with 100 g of and 150 g of ethanol, respectively, dried to a constant weight, and thereby yielded 328.15 g (yield: 75.9%) of 3-(10-undecenoylamido)propane-1,2-diol as a white powder. The structure of the resulting reaction product was identified through a $^1$H-NMR spectrum and an IR spectrum (FIGS. 1 and 2).

Example 2

Synthesis of
3-[N-Methyl(10-undecenoylamido)]propane-1,2-diol

Figure 3:
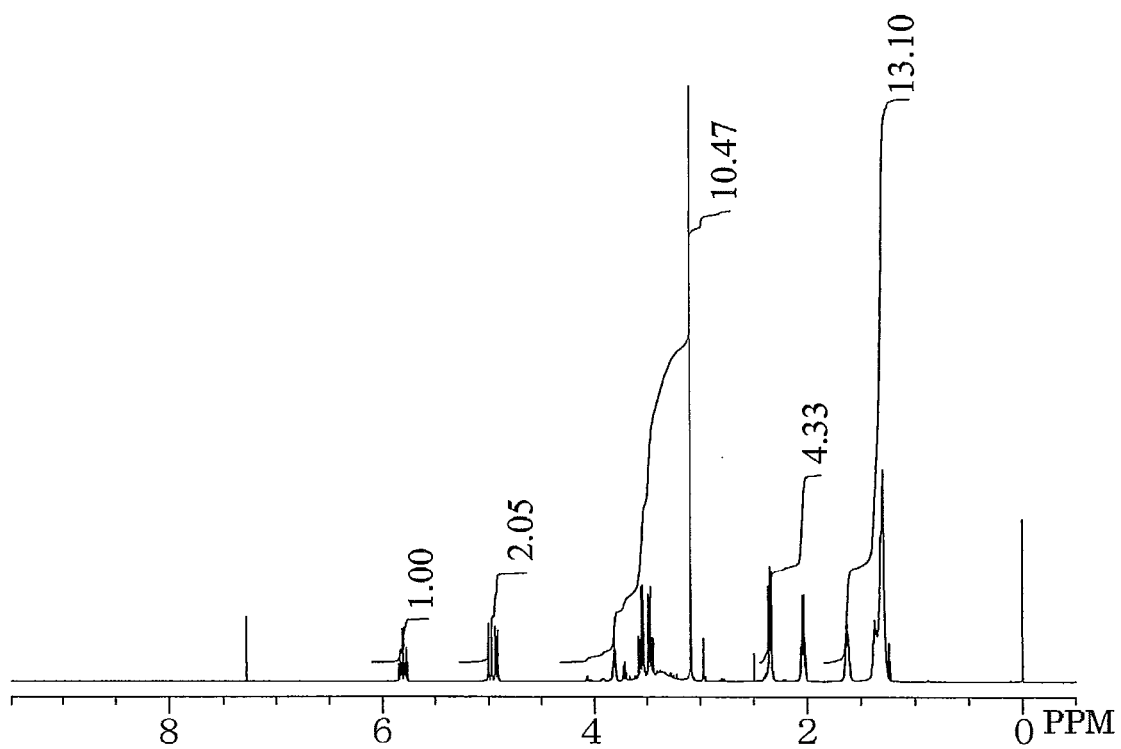
FIG. 3 depicts a $^1$H-NMR spectrum of a reaction product obtained in Example 2.
Figure 4:
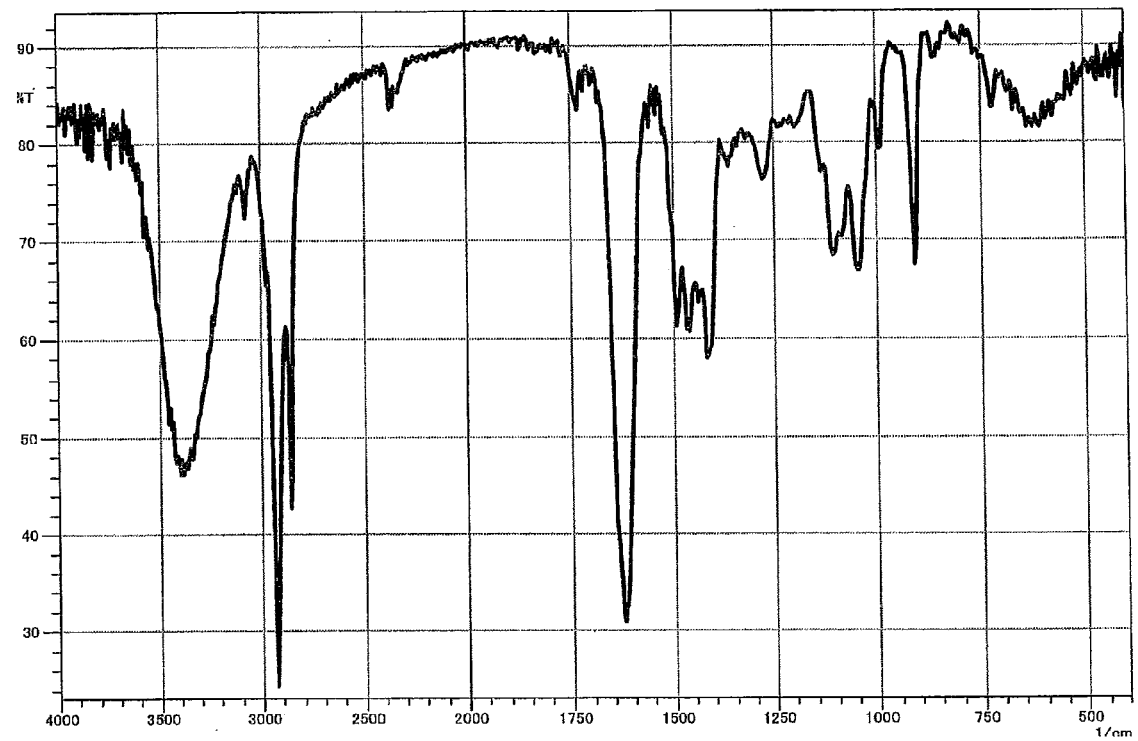
FIG. 4 depicts an IR spectrum of the reaction product obtained in Example 2.

In a 1-liter five-necked flask equipped with a reflux condenser, a nitrogen inlet with a three-way stopcock, a vent with a three-way stopcock, agitator blades with a decompression seal, and a thermometer were placed 317.29 g (1.60 mol) of methyl 10-undecenoate, 173.27 g (1.65 mol) of 3-aminopropane-1,2-diol, and 3.78 g (16.0 mmol) of a 24% solution of sodium methoxide in methanol. The mixture was subjected to a reaction by heating with stirring at 108° C. to 117° C. at a reduced pressure of 500 hPa to 50 hPa for 24.5 hours while distilling off formed methanol, cooled to room temperature, diluted with 290 g of ethanol with stirring, combined with 50 g of an inorganic synthetic adsorbent (trade name "Kyowaad 700", supplied by Kyowa Chemical Industry Co., Ltd.), heated with stirring at 75° C. for 2 hours, and filtrated. The filtrate was concentrated on a rotary evaporator, dried to a constant weight in a vacuum desiccator, and thereby yielded 382.80 g (yield: 77.5%) of 3-[N-methyl(10-undecenoylamido)]propane-1,2-diol as a white paste. The structure of the resulting reaction product was identified through a $^1$H-NMR spectrum and an IR spectrum (FIGS. 3 and 4).

Example 3

In a 300-ml five-necked flask equipped with a reflux condenser having a hydrogen inlet with a three-way stopcock, a nitrogen inlet with a three-way stopcock, a dropping funnel, agitator blades with a decompression seal, and a thermometer were placed 2.93 g of a dimethylsiloxane-methylhydrosiloxane copolymer (trade name "KF-9901", supplied by Shin-Etsu Chemical Co., Ltd., a compound represented by Formula (4) where $R^1$ to $R^9$ are methyl groups; hereinafter also referred to as "KF-9901") and 0.17 g of a 0.2 percent by weight isopropanol solution of chloroplatinic acid hexahydrate. Independently, a mixed solution of 2.28 g (16.2 mmol) of 1-decene, 0.54 g (1.8 mmol) of 3-[N-methyl(10-undecenoylamido)]propane-1,2-diol, and 5.8 g of isopropanol was placed in the dropping funnel, and the reactor (flask) was purged with nitrogen. The mixed solution was added dropwise from the dropping funnel over one hour with stirring at 40° C., the mixture was heated to 80° C. over 3 hours, followed by stirring for 19 hours while additionally adding 0.390 g (2.78 mmol) of 1-decene 6 hours later and 0.196 g (1.40 mmol) of 1-decene 12 hours later. After it was verified, through sampling of the reaction solution, that hydrogen evolution in a 0.1 N aqueous solution of KOH was not observed and that an NMR signal assigned to Si—H protons as observed at δ 4.65 to 4.70 ppm in $^1$H-NMR (deuterated chloroform) disappeared.

Figure 5:
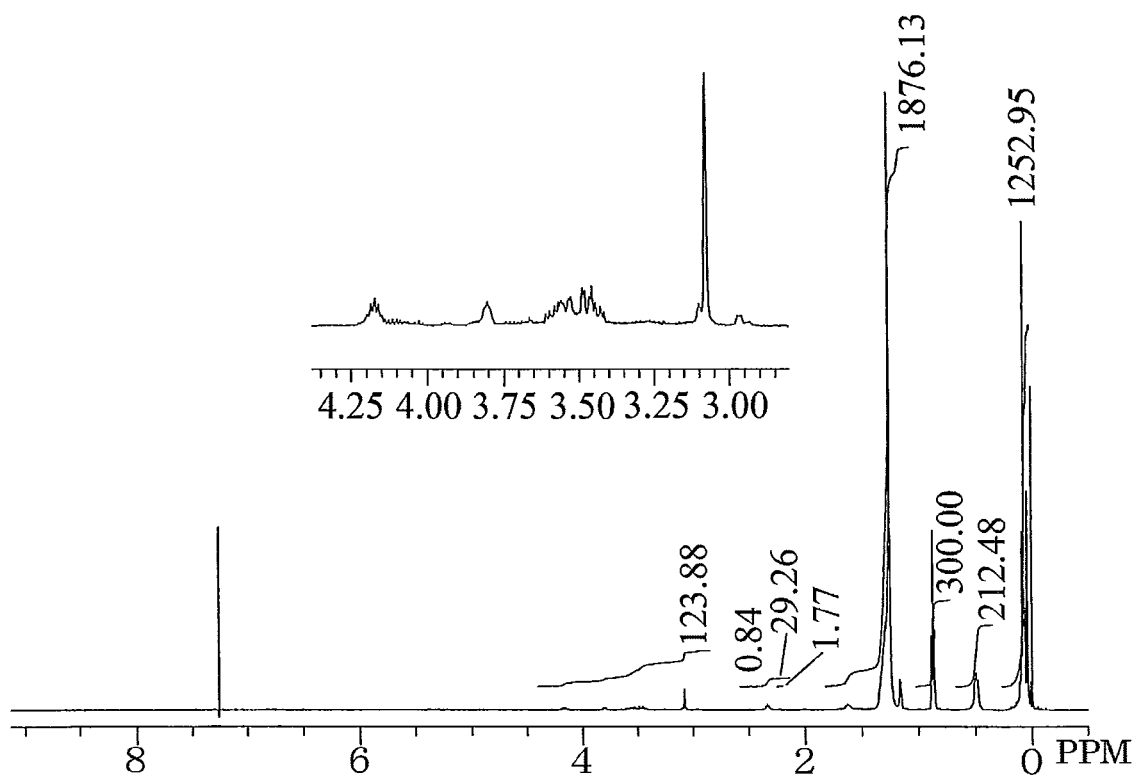
FIG. 5 depicts a $^1$H-NMR spectrum of a reaction product obtained in Example 3.
Figure 6:
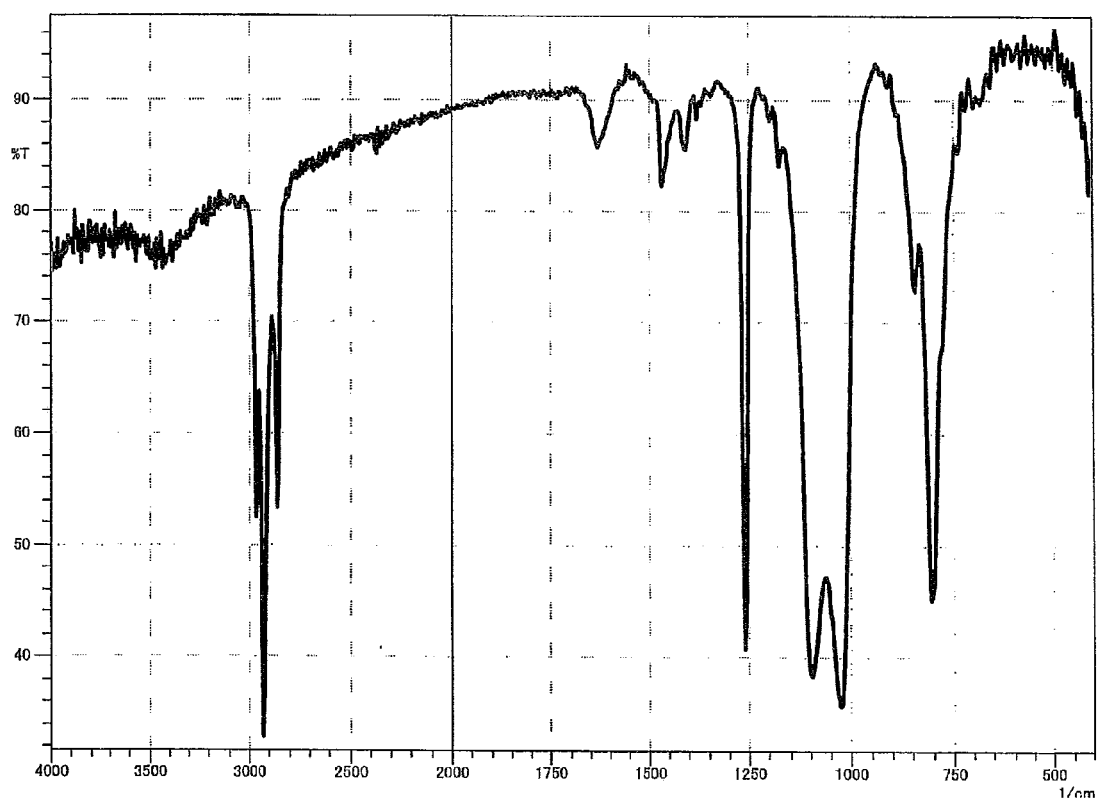
FIG. 6 depicts an IR spectrum of the reaction product obtained in Example 3.

Next, 0.030 g of a 10% palladium-supporting carbon (Type PE, supplied by N.E. Chemcat Corporation) was added, the reactor was hydrogen-purged, and the mixture was heated with stirring at 80° C. The heating with stirring was continued until it was verified, through sampling of the reaction solution at suitable intervals, that an NMR signal assigned to olefinic protons as observed at δ 5.3 ppm to δ 5.5 ppm in $^1$H-NMR (deuterated chloroform) disappeared, followed by cooling. The reaction mixture was filtrated through a membrane filter, concentrated on a rotary evaporator, and thereby yielded 4.30 g of a colorless, transparent, oily compound. The ratio among [siloxane units represented by Formula (b) (mole percent)]: [siloxane units represented by Formula (a1) (mole percent)]: [siloxane units represented by Formula (a2) (mole percent)] was calculated from integrals for $^1$H-NMR signals and found to be 59.4:37.0:3.6. The content of 3-(N-methyl-undecanoylamido)propane-1,2-diol was found to be 3.4 percent by weight. The structure of the resulting reaction product was identified through a $^1$H-NMR spectrum and an IR spectrum (FIGS. 5 and 6).

Example 4

In a 300-ml five-necked flask equipped with a reflux condenser having a hydrogen inlet with a three-way stopcock, a nitrogen inlet with a three-way stopcock, a dropping funnel, agitator blades with a decompression seal, and a thermometer were placed 58.67 g of "KF-9901" and 2.07 g of a 0.2 percent by weight isopropanol solution of chloroplatinic acid hexahydrate; whereas a mixed solution of 50.67 g (360 mmol) of 1-decene, 10.31 g (40 mmol) of 3-(10-undecenoylamido)propane-1,2-diol, and 119.47 g of isopropanol was placed in the dropping funnel; and the reactor was nitrogen-purged. After adding dropwise the mixed solution from the dropping funnel at 40° C. over one hour with stirring, the mixture was heated to 80° C. over 3 hours and additionally combined with 7.87 g (56 mmol) of 1-decene 5 hours later and 3.37 g (24 mmol) of 1-decene 12.5 hours later. The heating with stirring was continued until it was verified, through sampling of the reaction solution at suitable intervals, that hydrogen evolution in a 0.1 N aqueous solution of KOH was not observed and that an NMR signal assigned to Si—H protons as observed at δ 4.65 to 4.70 ppm in $^1$H-NMR (deuterated chloroform) disappeared. Thus, the reaction solution was cooled to room temperature 22 hours later.

Next, 0.6 g of a 10% palladium-supporting carbon (Type PE, supplied by N.E. Chemcat Corporation) was added and, after purging the reactor with hydrogen, the mixture was heated to 80° C. with stirring. The heating with stirring was continued until it was verified, through sampling of the reaction solution at suitable intervals, that an NMR signal assigned to olefinic protons as observed at δ 5.3 ppm to δ 5.5 ppm in $^1$H-NMR (deuterated chloroform) disappeared, followed by cooling. The reaction mixture was filtrated through a membrane filter, concentrated on a rotary evaporator to remove low-boiling substances, and thereby yielded 111.53 g of a colorless, transparent, oily compound. $^1$H-NMR data revealed that the ratio among [siloxane units represented by Formula (b) (mole percent)]:[siloxane units represented by Formula (a1) (mole percent)]:[siloxane units represented by Formula (a2) (mole percent)] is 57.4:40.7:1.9. The content of 3-(N-methyl-undecanoylamido)propane-1,2-diol was found to be 5.0 percent by weight.

Example 5

In a 300-ml five-necked flask equipped with a reflux condenser having a hydrogen inlet with a three-way stopcock, a nitrogen inlet with a three-way stopcock, a dropping funnel, agitator blades with a decompression seal, and a thermometer were placed 58.67 g of "KF-9901" and 2.07 g of a 0.2 percent by weight isopropanol solution of chloroplatinic acid hexahydrate; whereas a mixed solution of 44.90 g (320 mmol) of 1-decene, 20.53 g (80 mmol) of 3-(10-undecenoylamido)propane-1,2-diol, and 124.04 g of isopropanol was placed in the dropping funnel; and the reactor was nitrogen-purged. After adding dropwise the mixed solution from the dropping funnel at 40° C. over one hour with stirring, the mixture was heated to 80° C. over 3 hours and additionally combined with 7.86 g (56 mmol) of 1-decene 5 hours later and 3.37 g (24 mmol) of 1-decene 12.5 hours later. The heating with stirring was continued until it was verified, through sampling of the reaction solution at suitable intervals, that hydrogen evolution in a 0.1 N aqueous solution of KOH was not observed and that an NMR signal assigned to Si—H protons as observed at δ 4.65 to 4.70 ppm in $^1$H-NMR (deuterated chloroform) disappeared. Thus, the reaction solution was cooled to room temperature 22 hours later.

Next, 0.6 g of a 10% palladium-supporting carbon (Type PE, supplied by N.E. Chemcat Corporation) was added and, after purging the reactor with hydrogen, the mixture was heated to 80° C. with stirring. The heating with stirring was continued until it was verified, through sampling of the reaction solution at suitable intervals, that an NMR signal assigned to olefinic protons as observed at δ 5.3 ppm to δ 5.5 ppm in $^1$H-NMR (deuterated chloroform) disappeared, followed by cooling. The reaction mixture was filtrated through a membrane filter, concentrated on a rotary evaporator to remove low-boiling substances, and thereby yielded 110.92 g of a colorless, transparent, oily compound. The ratio among [siloxane units represented by Formula (b) (mole percent)]:[siloxane units represented by Formula (a1) (mole percent)]:[siloxane units represented by Formula (a2) (mole percent)] was calculated from integrals for $^1$H-NMR signals and found to be 57.8:36.8:5.4. The content of 3-(N-methyl-undecanoylamido)propane-1,2-diol was found to be 8.9 percent by weight.

Example 6

In a 300-ml five-necked flask equipped with a reflux condenser having a hydrogen inlet with a three-way stopcock, a nitrogen inlet with a three-way stopcock, a dropping funnel, agitator blades with a decompression seal, and a thermometer were placed 58.76 g of "KF-9901" and 2.081 g of a 0.2 percent by weight isopropanol solution of chloroplatinic acid hexahydrate; whereas a mixed solution of 50.50 g (360 mmol) of 1-decene, 10.83 g (40 mmol) of 3-[N-methyl(10-undecenoylamido)]propane-1,2-diol, and 120.07 g of isopropanol was placed in the dropping funnel; and the reactor was nitrogen-purged. After adding dropwise the mixed solution from the dropping funnel at 40° C. over one hour with stirring, the mixture was heated to 80° C. over 3 hours and further combined with 7.86 g (56 mmol) of 1-decene 5 hours later and 3.37 g (24 mmol) of 1-decene 12 hours later. The heating with stirring was continued until it was verified, through sampling of the reaction solution at suitable intervals, that hydrogen evolution in a 0.1 N aqueous solution of KOH was not observed and that an NMR signal assigned to Si—H protons as observed at δ 4.65 to 4.70 ppm in $^1$H-NMR (deuterated chloroform) disappeared. Thus, the reaction solution was cooled to room temperature 22 hours later.

Next, 0.6 g of a 10% palladium-supporting carbon (Type PE, supplied by N.E. Chemcat Corporation) was added and, after purging the reactor with hydrogen, the mixture was heated to 80° C. with stirring. The heating with stirring was continued until it was verified, through sampling of the reaction solution at suitable intervals, that an NMR signal assigned to olefinic protons as observed at δ 5.3 ppm to δ 5.5 ppm in $^1$H-NMR (deuterated chloroform) disappeared, followed by cooling. The reaction mixture was filtrated through a membrane filter, concentrated on a rotary evaporator to remove low-boiling substances, and thereby yielded 122.25 g of a colorless, transparent, oily compound. The ratio among [siloxane units represented by Formula (b) (mole percent)]:[siloxane units represented by Formula (a1) (mole percent)]:[siloxane units represented by Formula (a2) (mole percent)] was calculated from integrals for $^1$H-NMR signals and found to be 57.6:39.6:2.8. The content of 3-(N-methyl-undecanoylamido)propane-1,2-diol was found to be 3.9 percent by weight.

Example 7

In a 300-ml five-necked flask equipped with a reflux condenser having a hydrogen inlet with a three-way stopcock, a nitrogen inlet with a three-way stopcock, a dropping funnel, agitator blades with a decompression seal, and a thermometer were placed 58.67 g of "KF-9901" and 2.075 g of a 0.2 percent by weight isopropanol solution of chloroplatinic acid hexahydrate; whereas a mixed solution of 44.89 g (320 mmol) of 1-decene, 21.63 g (80 mmol) of 3-[N-methyl(10-undecenoylamido)]propane-1,2-diol, and 125.18 g of isopropanol was placed in the dropping funnel; and the reactor was nitrogen-purged. After adding dropwise the mixed solution from the dropping funnel at 40° C. over one hour with stirring, the mixture was heated to 80° C. over 3 hours, and further combined with 7.86 g (56 mmol) of 1-decene 5 hours later and 3.37 g (24 mmol) of 1-decene 12. 5 hours later. The heating with stirring was continued until it was verified, through sampling of the reaction solution at suitable intervals, that hydrogen evolution in a 0.1 N aqueous solution of KOH was not observed and that an NMR signal assigned to Si—H protons as observed at δ 4.65 to 4.70 ppm in $^1$H-NMR (deuterated chloroform) disappeared. Thus, the reaction solution was cooled to room temperature 19 hours later.

Next, 0.6 g of a 10% palladium-supporting carbon (Type PE, supplied by N.E. Chemcat Corporation) was added, and, after purging the reactor with hydrogen, the mixture was heated to 80° C. with stirring. The heating with stirring was continued until it was verified, through sampling of the reaction solution at suitable intervals, that an NMR signal assigned to olefinic protons as observed at δ 5.3 ppm to δ 5.5 ppm in $^1$H-NMR (deuterated chloroform) disappeared, followed by cooling. The reaction mixture was filtrated through a membrane filter, concentrated on a rotary evaporator to remove low-boiling substances, and thereby yielded 128.87 g of a colorless, transparent, oily compound. The ratio among [siloxane units represented by Formula (b) (mole percent)]: [siloxane units represented by Formula (a1) (mole percent)]: [siloxane units represented by Formula (a2) (mole percent)] was calculated from integrals for $^1$H-NMR signals and found to be 59.4:33.6:6.9. The content of 3-(N-methyl-undecanoylamido)propane-1,2-diol was found to be 5.9 percent by weight.

Examples 8 to 11 and Comparative Examples 1 and 2

Water (ion-exchanged water), an oil (dimethylpolysiloxane, trade name "SH200", supplied by Dow Corning Toray Co., Ltd.), and a surfactant were placed in a polypropylene centrifuge tube in the compositional ratio given in Table 1 below, mixed with a spatula, further stirred on a vortex mixer for 5 minutes, and thereby yielded a water-in-oil (W/O) emulsion with a high water content. The resulting emulsion was left stand at room temperature (25° C.) for one day, observed to see how an aqueous phase and an oily phase were separated from each other, and the emulsion stability of a sample was evaluated according to the following criteria.

Criteria:
Good: No distinct separation is observed;
Fair: A separated layer in an amount of less than 10 percent by volume is observed; and
Poor: A separated layer in an amount of 10 percent by volume or more is observed

TABLE 1

|  |  | Examples |  |  |  | Comparative Examples |  |
|---|---|---|---|---|---|---|---|
|  |  | 8 | 9 | 10 | 11 | 1 | 2 |
| Water | Ion-exchanged water | 50 | 50 | 50 | 50 | 50 | 50 |
| Oil | Dimethylpolysiloxane | 30 | 30 | 40 | 40 | 30 | 40 |
| Surfactant | Modified polysiloxane compound 1 | 20 |  | 10 |  |  |  |
|  | Modified polysiloxane compound 2 |  | 20 |  | 10 |  |  |
|  | Silicone emulsifier polymer |  |  |  |  | 20 | 10 |
| Evaluation on emulsion stability |  | Good | Fair | Fair | Fair | Poor | Poor |

The surfactants used herein are the following compounds.
Modified polysiloxane compound 1: Compound obtained in Example 7
Modified polysiloxane compound 2: Compound obtained in Example 4
Silicone emulsifier polymer: Glyceryl-ether-modified silicone, trade name "PENETOL SI-U", supplied by Kao Corporation Table 1 demonstrates that modified polysiloxane compounds according to the present invention are substances exhibiting satisfactory emulsifying capacity. The modified polysiloxane compounds are therefore advantageously usable in applications to which amphiphilic compounds are applicable (e.g., dispersing agents and polymer emulsifiers, as well as additives typically for coating agents) and particularly suitably used in wide variety of cosmetic compositions as products to which emulsification is applied.

While preferred embodiments of the present invention have been described using specific terms, such description is for illustrated purposes only, and it is to be understood that various changes and modifications may be made without departing from the spirit and scope of the present invention as defined in the appended claims.

The invention claimed is:
1. A modified polysiloxane compound of Formula (1):

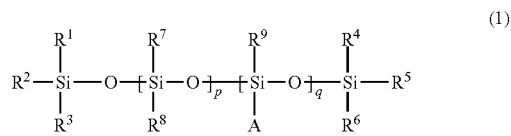

wherein $R^1$, $R^2$, $R^3$, $R^4$, $R^5$, $R^6$, $R^7$, $R^8$, and $R^9$ are the same as or different from one another and independently represent a hydrocarbon group selected from the group consisting of a linear alkyl group having 1 to 20 carbon atoms, a branched chain alkyl group having 3 to 6 carbon atoms, and a cyclic alkyl group having 3 to 6 carbon atoms; p and q each represent an average number of siloxane units indicated in parentheses, where p is a number of 1 or more and q is a number of 2 or more; and "A" represents a group selected from the group consisting of a group of Formula (2), a group of Formula (3), and hydrogen atom, and wherein the modified polysiloxane compound has at least (i) a siloxane unit wherein "A" is the group of Formula (2) and (ii) a siloxane unit wherein "A" is the group of Formula (3):

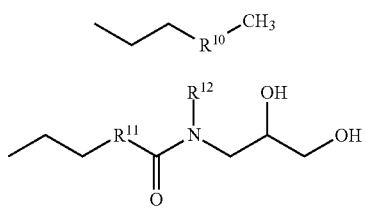

(2)

(3)

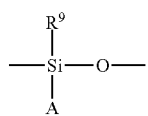

wherein $R^{10}$ represents single bond or a linear or branched chain alkylene group having 1 to 17 carbon atoms; $R^{11}$ represents single bond or a linear or branched chain alkylene group having 1 to 17 carbon atoms; and $R^{12}$ represents hydrogen atom or a linear, branched chain, or cyclic alkyl group having 1 to 6 carbon atoms.

2. The modified polysiloxane compound according to claim 1, wherein, in siloxane units of Formula (a):

(a)

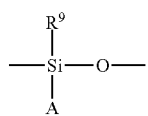

wherein $R^9$ and "A" are as defined above, the content of a siloxane unit of Formula (a) wherein "A" is the group of Formula (3) is 1 mole percent or more based on the total moles of the siloxane units of Formula (a).

3. The modified polysiloxane compound according to claim 1, wherein (p+q) is from 4 to 5000, and wherein p/(p+q) is from 0.05 to 0.9.

4. The modified polysiloxane compound according to claim 1, wherein (p+q) is from 10 to 30.

5. The modified polysiloxane compound according to claim 1, wherein $R^1$ to $R^9$ are methyl groups; and $R^{12}$ is hydrogen atom or methyl group.

6. A method for producing the modified polysiloxane compound of claim 1, the method comprising the step of grafting, through a hydrosilylation reaction, a compound of Formula (5) and a compound of Formula (6):

(5)

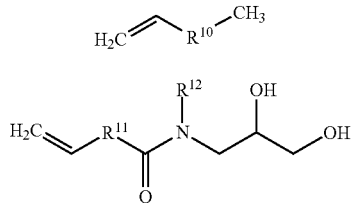

(6)

wherein $R^{10}$ represents single bond or a linear or branched chain alkylene group having 1 to 17 carbon atoms; $R^{11}$ represents single bond or a linear or branched chain alkylene group having 1 to 17 carbon atoms; and $R^{12}$ represents hydrogen atom or a linear, branched chain, or cyclic alkyl group having 1 to 6 carbon atoms,
to a polysiloxane compound of Formula (4):

(4)

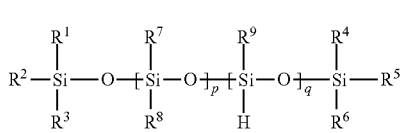

wherein $R^1$, $R^2$, $R^3$, $R^4$, $R^5$, $R^6$, $R^7$, $R^8$, and $R^9$ are the same as or different from one another and independently represent a hydrocarbon group selected from the group consisting of a linear alkyl group having 1 to 20 carbon atoms, a branched chain alkyl group having 3 to 6 carbon atoms, and a cyclic alkyl group having 3 to 6 carbon atoms; and p and q each represent an average number of siloxane units indicated in parentheses, where p is a number of 1 or more and q is a number of 2 or more.

7. The modified polysiloxane compound according to claim 1, wherein,
in siloxane units of Formula (a):

(a)

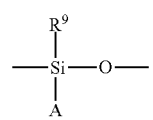

wherein $R^9$ and "A" are as defined above, (p+q) is from 4 to 5000, and p/(p+q) is from 0.05 to 0.9, the content of a siloxane unit of Formula (a) wherein "A" is the group of Formula (2) is 75 to 99 mole percent based on the total moles of the siloxane units of Formula (a), and
in siloxane units of Formula (a):

(a)

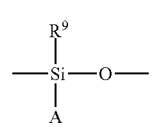

wherein $R^9$ and "A" are as defined above, (p+q) is from 4 to 5000, and p/(p+q) is from 0.05 to 0.9, the content of a siloxane unit of Formula (a) wherein "A" is the group of Formula (3) is 1 to 25 mole percent based on the total moles of the siloxane units of Formula (a).

* * * * *